United States Patent [19]

Staiger

[11] Patent Number: 6,026,635
[45] Date of Patent: Feb. 22, 2000

[54] CUTTING DEVICE FOR LAWN MOWER

[75] Inventor: Jürgen Staiger, Königsfeld-Erdmannsweiler, Germany

[73] Assignee: Horst Staiger & Sohne GmbH, Germany

[21] Appl. No.: 09/184,733

[22] Filed: Nov. 2, 1998

[30] Foreign Application Priority Data

Nov. 3, 1997 [DE] Germany ............................ 197 48 475

[51] Int. Cl.⁷ .................................................. A01D 34/52
[52] U.S. Cl. ............................................................. 56/295
[58] Field of Search ............................ 56/12.5, 255, 295, 56/DIG. 17, DIG. 20, 320.1

[56] References Cited

U.S. PATENT DOCUMENTS

| 4,114,354 | 9/1978 | Morris ...................................... 56/295 |
| 4,158,945 | 6/1979 | Burke ....................................... 56/503 |
| 4,335,567 | 6/1982 | Comer . |
| 4,351,143 | 9/1982 | Lessig, III ................................ 56/17.5 |
| 4,999,981 | 3/1991 | Neuerburg ................................... 56/6 |
| 5,271,212 | 12/1993 | Anderson ................................. 56/12.7 |
| 5,561,972 | 10/1996 | Rolfe ........................................ 56/295 |
| 5,577,375 | 11/1996 | Tillison, Sr. ............................. 56/17.5 |
| 5,605,032 | 2/1997 | Gantzer . |
| 5,609,011 | 3/1997 | Kuhn et. al. ............................. 56/17.5 |
| 5,761,891 | 6/1998 | Ferrai ........................................... 56/6 |
| 5,842,330 | 12/1998 | Richardson et al. ........................ 56/6 |
| 5,845,405 | 12/1993 | Rosdahl ................................... 30/276 |

FOREIGN PATENT DOCUMENTS

| 0 255 459 | 2/1988 | European Pat. Off. . |
| 0 763 319 A1 | 3/1997 | European Pat. Off. . |
| 70 12 322 | 7/1970 | Germany . |
| 1187207 | 4/1970 | United Kingdom . |
| 2 170 086 | 7/1986 | United Kingdom . |

Primary Examiner—Thomas B. Will
Assistant Examiner—Arapad Fabian Kovacs
Attorney, Agent, or Firm—Pendorf & Cutliff

[57] ABSTRACT

Mowing mechanism for lawn mower with a housing (10) and at least one motor driven blade disc provided in the housing (18, 20), on which cutting blades (20, 24) are secured. Pairs of each other opposing cutting blades (20, 24) extend outwardly from the blade disk and parallel to them, wherein each pair is comprised of an upper blade (22) and a lower blade (24). The cutting blades (22, 24) can exhibit shovel like bent edges (32) for achieving a ventilator effect. When desired two identical blade disks (18, 20) can be provided to each other in the housing, wherein the areas of coverage of the respective blades (22, 24) overlap with each other.

10 Claims, 2 Drawing Sheets

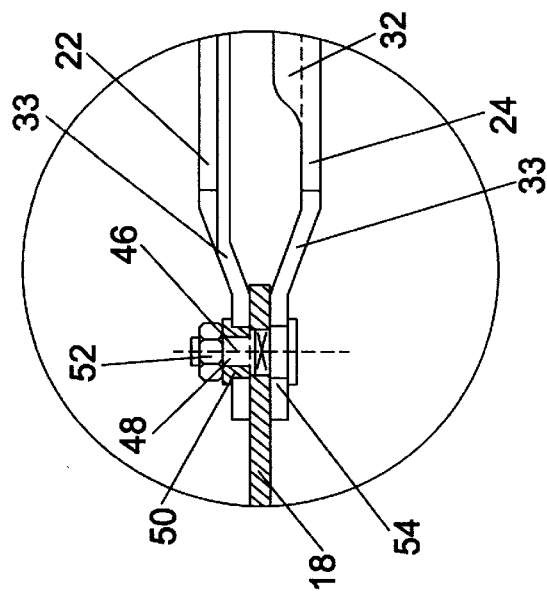
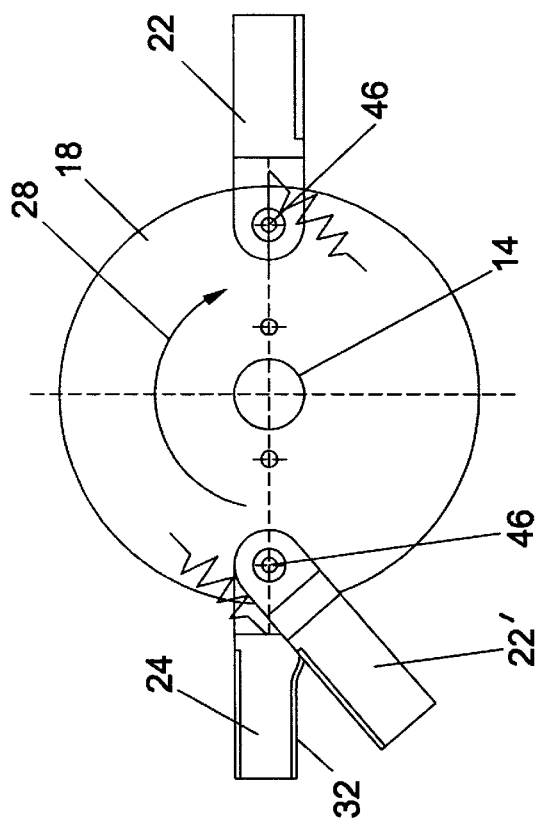
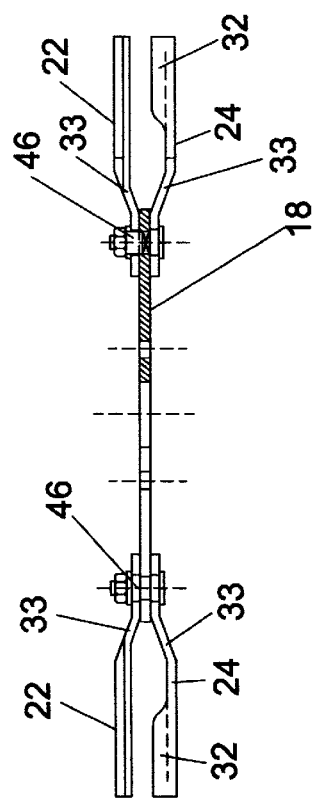

CUTTING DEVICE FOR LAWN MOWER

BACKGROUND OF THE INVENTION

1. Field of the Invention

The invention concerns a cutting device or mowing mechanism for a lawn mower.

2. Description of the Related Art

A mowing mechanism of this type is known from German Utility Model 70 12 322. Further, from U.S. Pat. No. 5,605,032 a device for mowing and mulching of plants is known, in which respectively pairs of oppositely lying cutting blades are secured to and extend essentially parallel outwards from a cutting disk. Cut plants are further mulched via these cutting and mulching devices.

With known mowing mechanisms of this type it is often a problem, that the more-or-less moist material being cut agglomerates and cakes on the inner side of the mowing mechanism housing, so that the rotation of the disk with swing-out blades and the desired flow of air through the housing, which transports the material being cut, is impeded.

SUMMARY OF THE INVENTION

In accordance with the invention a cutting device of the above described type should be so improved, that an impedance of the disk with swing-out blades and the flow of air through the housing does not occur.

The upper blade of each blade pair continuously shaves the somewhat adhering mowed material from the inner surface of the housing, so that this is taken along in the air stream. In addition the upper blade produces a supplemental airflow, so that the total airflow is further improved, in comparison to known disks with swing-out blades with single cutting blades.

The dependent claims concern advantageous embodiments of the invention. In particular the invention can be economically realized when the cutting blades are, so called centrifugal blades and are secured to the cutting disk pivotally against a spring force. In order to increase the separation between the cutting blades of a pair, they can be suitably double-bent or offset so that they project parallel outwards at a somewhat greater separation with respect to each other. Thereby the transport of cut material and air through the mowing mechanism is facilitated.

Herein it is also possible, that at least one cutting blade of each pair, preferably the lower blade, be provided with a shovel like canted edge, in order likewise to increase the air flow. If desired the upper blade can also exhibit a canted edge similar to that of the lower blade.

The invention can also very appropriately be applied to mowing mechanisms in which two disks with swing-out blades are provided arranged side-by-side, which are driven counter rotationally. The inventive measures have particularly advantageous effects when the areas of coverage of the cutting blades of two disks with swing-out blades overlap somewhat. In this case however the disks with swing-out blades must be driven synchronized counter rotationally and the cutting blades of the two disks with swing-out blades must be angularly offset with respect to each other, since they would otherwise interfere with each other.

A so-called mowing-mulching can be carried out as desired with the inventive mowing mechanism, wherein either the direction of rotation of the two disks with swing-out blades are reversed or the two disks with swing-out blades are exchanged with respect to each other. In this case the mowed material is, during mowing, thrown outwards from the front.

The volume of air flow-through is also further increased by the feature, in that the lower edge or rim of the housing is somewhat arched or curved towards inwards.

BRIEF DESCRIPTION OF THE DRAWINGS

An illustrative embodiment of the invention is described in greater detail by reference to the figures. There is shown.

DETAILED DESCRIPTION OF THE INVENTION

Figure 1:
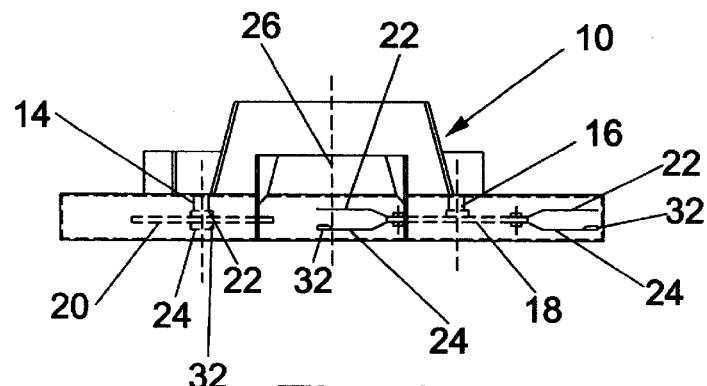
FIG. 1 a schematic rear view of the inventive mowing mechanism.
Figure 2:
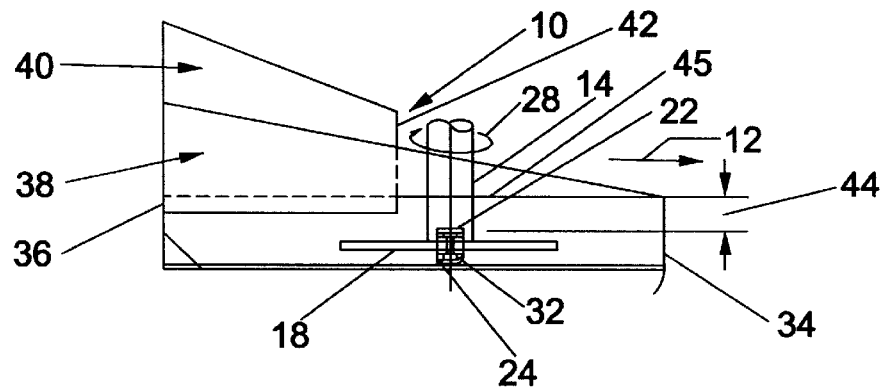
FIG. 2 a schematic side view of the mowing mechanism shown in FIG. 1 in an enlarged scale, FIG. 3 a schematic top view of the mowing mechanism according to FIGS. 1 and 2, wherein the scale is again enlarged in comparison to FIG. 2, FIG. 4 a top view of a disk with swing-out blades employed in the mowing mechanism according to FIG. 1 in a scale which is again enlarged in comparison to FIG. 3, FIG. 5 a partial sectional side view of the disk with swing-out blades according to FIG. 4 and FIG. 6 a partial sectional view of the blade mounting means in a scale again enlarged with respect to FIG. 5.

In the embodiment of the inventive mowing mechanism shown in the figures there are in the housing generally designated with 10 two disks with swing-out blades 18 or as the case may be 20 arranged side by side with respect to the direction of mowing represented by the arrow 12 in FIG. 2, and respectively driven via one motor driven drive shaft 14 or as the case may be 16 in a manner not shown in greater detail. Each disk with cutting blades 18, 20 carries close to its circumference respectively a pair of cutting blades, each of which is comprised of an upper blade 22 and a lower blade 24. The blade pairs 22, 24 extend from their disk with swing-out blades 18, 20 respectively somewhat beyond the center plane 26 of the housing 10 towards the respectively other disk with swing-out blades 20, 18, so that the cutting areas of the two disks with cut blades 18, 20 overlap in the central area.

Figure 3:
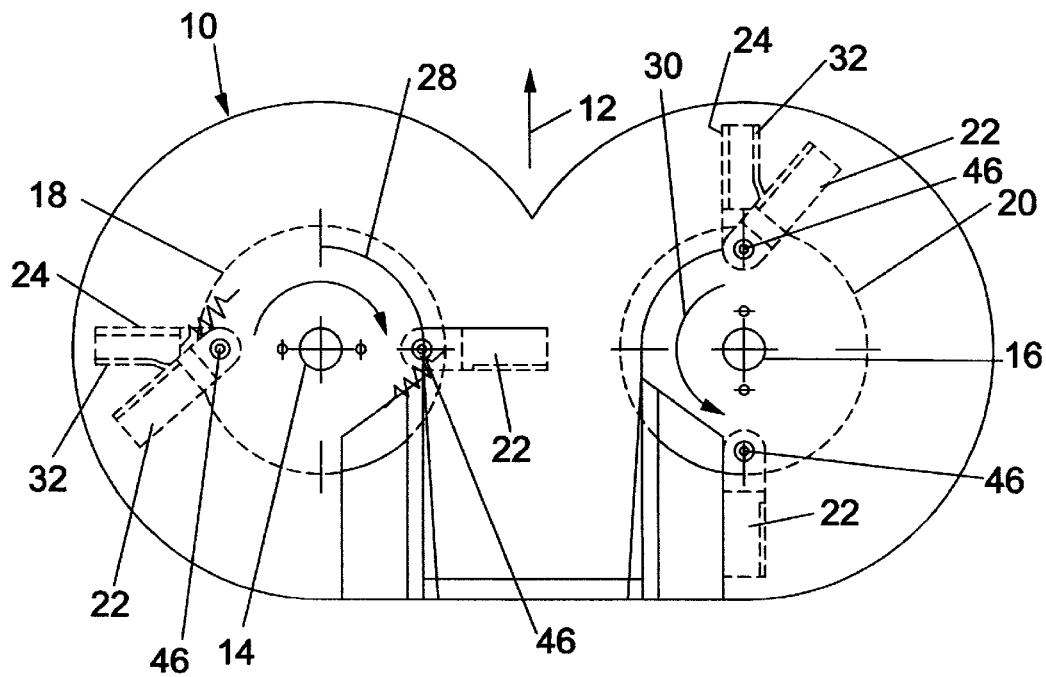

Thereby there is achieved not only an excellent mowing quality, but rather also an excellent conveyance of cut material and air through the housing. So that the two blade pairs 22, 24 of the two disks with swing-out blades 18, 20 do not respectively impede each other, the two disks with swing blades 18, 20 must be driven synchronously counter-rotationally, which can be accomplished by a person of ordinary skill in a known manner by positive coupling of the two not shown drive motors. At the same time the cutting blades 22, 24 must, in the shown embodiment, be staggered on the two disks with swing-out blades 18, 20 respectively about 90° in the direction of rotation with respect to each other. The rotation of the two disks with swing-out blades 18, 20 occurs thereby normally in the manner shown by the arrows 28 and 30 in FIG. 3. Should in contrast thereto the conveyance direction of the air and the cut material be reversed, in order to make possible a mowing milling with simultaneous mowing and depositing of the mowed material forward of the front end of the housing, then either the direction of rotation of the two disks with swing-out blades 18, 20 must be reversed or the two disks with swing-out blades 18, 20 must be exchanged with each other, which can be achieved by appropriate mounting means on the drive shafts 14, 16.

With the here shown embodiments the lower blades 24 respectively exhibit a shovel-like upwards bending 32, which during rotation in the sense of the arrows 28, 30 achieves a ventilator effect, which mutually strengths in the central area between the two disks with swing-out blades 18, 20.

As can be seen particularly from FIGS. 4 through 6, the cutting blades 22, 24 exhibit respectively double-bends or offsets 33 close to the circumference of the respective disk with swing-out blades 18, 20, wherein the two double-bends 33 lead away from each other, so that the two cutting blades 22, 24 over the larger part of their lengthwise extension have a larger separation from each other than in the area of their respective disks with swing-out blades 18, 20.

The housing 10 forms, going from its front wall 34 to its back end opening 36, on which a not shown grass catcher device or the like is connected, an outflow channel 38, above which an air return channel 40 is formed with a front outlet opening 42. The separation between respective upper blade 22 and the upper side 45 of the mower housing 10 in the area of the disk with swing-out blades 18, 20 is shown in FIG. 2 with reference number 44 and can be reduced if desired by a stronger double-bending of the upper blade 22.

In the illustrative embodiments, as can be particularly seen in FIGS. 4 through 6, the cutting blades 22, 24, which are so called centrifugal force blades, are respectively pivotably coupled onto the corresponding disk with swing-out blades 18, 20 about an axis 46 extending perpendicularly to disk with swing-out blades 18, 20. Each pair of blades 22, 24 is pivotably mounted by means of a flange bolt 48, a this encompassing flange or shoulder bushing 50, as well as a nut 52 screwable on the flange bolt 48, under the influence of a cup spring 54 between respectively a blade 22 or as the case may be 24 and the blade disk 18, 20 against the force of the cup spring 54, so that during encountering of obstructions they can deflect and upon resumption of rotation of the blade disks 18, 20 by centrifugal force again be caused to radially extend towards outwards. In FIG. 4 it is shown how one of the upper blades 22 can swing backwards against the direction of rotation 28 in comparison to the pair forming lower blade 24. The same swinging is also shown for the upper blade 22 in FIG. 3.

What is claimed is:

1. Mowing mechanism for a lawn mower comprising:
   a housing including a lower edge open to the ground, a discharge channel (38) for discharging air and cuttings from said housing, and an air return channel (40) in communication with said housing and said discharge channel (38), said return channel adapted for returning discharged air from said discharge channel back into said housing,
   at least two blade disks (18, 20), provided within the housing (10) side-by-side with reference to the forward direction of mowing (12), each blade disk having a lower side, an upper side, and an outer circumference,
   respective pairs of cutting blades (22, 24) of similar design mounted on opposite sides of said blade disk and close to the circumference of said blade disk, extending outwards from and essentially parallel to said blade disk (18, 20), wherein each blade pair is comprised of a lower blade (24) mounted on the lower side of the blade disk (18, 20) and an upper blade (22) mounted on the upper side of the blade disk (18, 20),
   wherein the areas of coverage of the cutting blades (22, 24) of the two blade disks (18, 20) overlap each other, wherein the blade disks (18, 20) are driven synchronized counter-rotationally, wherein the two blade disks (18, 20) are driven so that the direction of rotation (28, 30) of the two blade disks (18, 20) is reversible, and wherein the cutting blades (22, 24) of the two cutting disks (18, 20) are angularly offset with respect to each other.

2. Mowing mechanism according to claim 1, wherein each upper blade (24) is located in close proximity to the upper side (42) of the housing (10).

3. Mowing mechanism according to claim 1, wherein the cutting blades (22, 24) are centrifugal blades secured pivotably against a spring force (54) on the blade disk (18, 20).

4. Mowing mechanism according to claim 1, wherein the cutting blades (22, 24) of each pair, past the circumference of the blade disk (18, 20), exhibit double-bends (33) deviating from each other.

5. Mowing mechanism according to claim 1, wherein at least one cutting blade (22, 24) of each pair has a cutting edge and a trailing edge, and on its trailing edge exhibits a shovel like cant (32) towards the other cutting blade (24, 22) of the pair.

6. Mowing mechanism according to claim 5, wherein both cutting blades (22, 24) exhibit a shovel like canted edge (33) directed toward the other cutting blade (24, 22) of the pair.

7. Mowing mechanism according to claim 1, wherein the two blade disks (18, 20) are exchangeable with each other.

8. Mowing mechanism according claim 1, wherein the lower edge of the housing (10) is curved inwardly.

9. Mowing mechanism for a lawn mower comprising:
   a housing including a discharge channel (38) for discharging air and cuttings from said housing and an air return channel (40) in communication with said housing and said discharge channel (38), said return channel adapted for returning discharged air back into said housing,
   at least two blade disks (18, 20) provided within the housing (10), side-by-side with reference to the forward direction of mowing (12), each blade disk having a lower side, an upper side and an outer circumference,
   respective pairs of cutting blades (22, 24) of similar design mounted on opposite sides of said blade disk and close to the circumference of said blade disk, extending outwards from and essentially parallel to said blade disk (18, 20), wherein each blade pair is comprised of a lower blade (24) mounted on the lower side of the blade disk (18, 20) and an upper blade (22) mounted on the upper side of the blade disk (18, 20), and wherein said blades are designed to generate a flow of air,
   wherein the areas of coverage of the cutting blades (22, 24) of the two blade disks (18, 20) overlap each other, wherein the blade disks (18, 20) are driven synchronized counter-rotationally, wherein said cutting blades while in said area of overlap move in a direction opposite to the forward direction of mowing (12), and wherein the cutting blades (22, 24) of the two cutting disks (18, 20) are angularly offset with respect to each other.

10. Mowing mechanism for a lawn mower comprising:
    a housing including a discharge channel (38) for discharging air and cuttings from said housing and an air return channel (40) in communication with said housing and said discharge channel (38), said return channel adapted for returning discharged air back into said housing,
    at least two blade disks (18, 20) provided within the housing (10), side-by-side with reference to the forward direction of mowing (12), each blade disk having a lower side, an upper side and an outer circumference, respective pairs of cutting blades (22, 24) of similar design mounted on opposite sides of said blade disk and close to the circumference of said blade disk, extending outwards from and essentially parallel to said blade disk (18, 20), wherein each blade pair is comprised of a lower blade (24) mounted on the lower side of the blade disk (18, 20) and an upper blade (22) mounted on the upper side of the blade disk (18, 20), and wherein at least one cutting blade (22, 24) of each pair has a cutting edge and a trailing edge, and on its trailing edge exhibits a shovel like cant (32) towards the other cutting blade (24, 22) of the pair, wherein the areas of coverage of the cutting blades (22, 24) of the two blade disks (18, 20) overlap each other, wherein the blade disks (18, 20) are driven synchronized counter-rotationally, wherein said cutting blades while in said area of overlap move in a direction opposite to the forward direction of mowing (12), and wherein the cutting blades (22, 24) of the two cutting disks (18, 20) are angularly offset with respect to each other.

* * * * *